(12) United States Patent
Sung et al.

(10) Patent No.: US 7,801,230 B2
(45) Date of Patent: Sep. 21, 2010

(54) CHANNEL ESTIMATION METHOD AND APPARATUS IN AN ORTHOGONAL FREQUENCY DIVISION MULTIPLEXING (OFDM) WIRELESS COMMUNICATION SYSTEM

(75) Inventors: Joon-Hyun Sung, Seoul (KR); Jeong-Taek Lee, Seoul (KR); Eoi-Young Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 658 days.

(21) Appl. No.: 11/760,882

(22) Filed: Jun. 11, 2007

(65) Prior Publication Data

US 2008/0080636 A1   Apr. 3, 2008

(30) Foreign Application Priority Data

Sep. 29, 2006   (KR) ...................... 10-2006-0095756

(51) Int. Cl.
  *H04K 1/10*   (2006.01)
(52) U.S. Cl. ...................... 375/260; 370/210
(58) Field of Classification Search ................. 375/260; 370/210
  See application file for complete search history.

(56) References Cited

U.S. PATENT DOCUMENTS

| 7,430,243 | B2* | 9/2008 | Giannakis et al. ........... 375/267 |
| 7,639,600 | B1* | 12/2009 | Lou et al. ................... 370/208 |
| 2005/0286406 | A1* | 12/2005 | Jeon et al. ................... 370/208 |
| 2006/0056526 | A1* | 3/2006 | Jain ........................... 375/260 |
| 2007/0297529 | A1* | 12/2007 | Zhou et al. .................. 375/267 |
| 2009/0129499 | A1* | 5/2009 | Kwak et al. .................. 375/267 |
| 2009/0310656 | A1* | 12/2009 | Maltsev et al. ............... 375/219 |

FOREIGN PATENT DOCUMENTS

| KR | 10-2003-0014078 A | 2/2003 |
| KR | 10-2006-0000054 A | 1/2006 |
| KR | 10-2006-0038070 A | 5/2006 |
| KR | 10-2006-0095256 A | 8/2006 |
| KR | 10-2006-0117168 A | 11/2006 |

OTHER PUBLICATIONS van de Beek et al., "On Channel Estimation in OFDM Systems," Proc. of the Vehicular Technology Conf., Chicago, USA, vol. 2, pp. 815-819, Jul. 1995.*

Ye (Geoffrey) Li, "Simplified Channel Estimation for OFDM Systems With Multiple Transmit Antennas," IEEE Transactions on Wireless Communications, vol. 1, No. 1, pp. 67-75, Jan. 2002.*

(Continued)

*Primary Examiner*—Juan A Torres
(74) *Attorney, Agent, or Firm*—Sughrue Mion, PLLC

(57) ABSTRACT

A method and apparatus for estimating a channel in an Orthogonal Frequency Division Multiplexing (OFDM) wireless communication system. A Least-Square (LS) channel estimator receives a training sequence, and performs LS channel estimation on each of a predetermined number of subcarriers independently. A Split Minimum-Mean-Square-Error (S-MMSE) channel estimator separates the predetermined number of subcarriers into a predetermined number of groups, calculates an S-MMSE filter for a subcarrier in each group, and estimates an S-MMSE channel by applying the S-MMSE filter to each of the groups.

10 Claims, 5 Drawing Sheets

OTHER PUBLICATIONS

Akhtman,"Generic reduced-complexity MMSE channel estimation for OFDM and MC-CDMA," 2005 IEEE 61st Vehicular Technology Conference, 2005, VTC 2005-Spring vol. 1, May 30-Jun. 1, 2005 pp. 528-532 vol. 1.*

Edfors, "OFDM channel estimation by singular value decomposition," IEEE Transactions on Communications, vol. 46, Issue 7, Jul. 1998 pp. 931-939.*

Chen, "Channel estimation for space time coded OFDM systems in non-sample-spaced multipath channels", 2002 IEEE Wireless Communications and Networking Conference, 2002, WCNC2002, vol. 1, Mar. 17-21, 2002 pp. 61-66 vol. 1.*

Jia-Ming, "A new channel estimation model in OFDM system based on improved pilot training sequence", ICMMT 4th International Conference on Microwave and Millimeter Wave Technology, 2004, Proceedings Aug. 18-21, 2004 pp. 846-849.*

Yuan, "Channel estimation for OFDM system with fast fading channels", 2004 International Conference on Communications, Circuits and Systems, 2004, ICCCAS 2004, vol. 1, Jun. 27-29, 2004 pp. 295-298 vol. 1.*

Sand, "Iterative channel estimation for MC-CDMA," 2005 IEEE 61st Vehicular Technology Conference, 2005, VTC 2005-Spring,vol. 1, May 30-Jun. 1, 2005 pp.471-475 vol. 1.*

Wu, "Deterministic OFDM Channel Estimator Based on Nonmaximally Decimated Filterbanks," International Conference on Wireless Communications, Networking and Mobile Computing, 2006, WiCOM 2006, Sep. 22-24, 2006 pp. 1-4.*

Shen, "Analysis of pilot-assisted channel estimators for OFDM systems with transmit diversity," IEEE Transactions on Broadcasting, vol. 52, issue 2, Jun. 2006 pp. 193-202.*

Lei, "Low-Complexity Detection Exploiting Subcarrier Correlation in Multi-Layer STBC OFDM," Personal, Indoor and Mobile Radio Communications, 2006 IEEE 17th International Symposium on Sep. 11-14, 2006 pp. 1-6).*

Yan, "A low complexity VBLAST OFDM detection algorithm," Acoustics, Speech, and Signal Processing, 2004. Proceedings. (ICASSP '04). IEEE International Conference on vol. 4, May 17-21, 2004 pp. iv-801-4 vol. 4.*

Lei, "Comparison Study of Low-Complexity Detection Schemes Exploiting Subcarrier Correlation for V-BLAST OFDM," Wireless Communications, Networking and Mobile Computing, 2006. WiCOM 2006.International Conference on Sep. 22-24, 2006 pp. 1-5.*

Lei, "Performance Comparison of Low-Complexity Detection Schemes for V-BLAST Coded MIMO-OFDM," Wireless Communication Systems, 2006. ISWCS '06. 3rd International Symposium on, Sept. 6-8, 2006 pp. 739-743.*

Kashima , "Adaptive MAP receiver via the EM algorithm and message passings for MIMO-OFDM mobile communications, " Selected Areas in Communications, IEEE Journal on vol. 24, Issue 3, Mar. 2006 pp. 437-447.*

Hou, "Two-dimensional recursive least square adaptive channel estimation for OFDM systems," Wireless Communications, Networking and Mobile Computing, 2005. Proceedings. 2005 International Conference on vol. 1, Sep. 23-26, 2005 pp. 232-236.*

Nallanathan, "Adaptive channel estimation and interference cancellation in space-time coded OFDM systems," Vehicular Technology Conference, 2004. VTC 2004-Spring. 2004 IEEE 59th vol. 3, May 17-19, 2004 pp. 1760-1764 vol. 3.*

Kashima , "iterative-MAP adaptive detection via the EM algorithm for LDPC-coded MIMO-OFDM mobile communications in fast fading channels," Vehicular Technology Conference, 2005. VTC 2005-Spring. 2005 IEEE 61st vol. 3, May 30-Jun. 1, 2005 pp. 1681-1685 vol. 3.*

Yang, "A joint channel estimation scheme with MMSE and FRLS for wireless MIMO-OFDM, " Emerging Technologies: Frontiers of Mobile and Wireless Communication, 2004. Proceedings of the IEEE 6th Circuits and Systems Symposium on vol. 2, May 31-Jun. 2, 2004 pp. 623-626 vol. 2.*

Wang et al. "Modified Channel Estimation Algoriithms for OFDM Systems with Reduced Complexity." Signal Processing, ICSP '04, 2004 7th International Conference, vol. 2, pp. 1747-1751.

Zhu et al. "A Low-Complexity Channel Estimator for OFDM Systems in Multipath Fading Channels." Personal, Indoor and Mobile Radio Communications, 2004, 15th IEEE International Symposium, vol. 3, pp. 1978-1982.

* cited by examiner

CHANNEL ESTIMATION METHOD AND APPARATUS IN AN ORTHOGONAL FREQUENCY DIVISION MULTIPLEXING (OFDM) WIRELESS COMMUNICATION SYSTEM

CROSS-REFERENCE TO RELATED PATENT APPLICATION

This application claims the benefit under 35 U.S.C. §119 (a) of a Korean Patent Application No. 10-2006-95756 filed in the Korean Intellectual Property Office on Sep. 29, 2006, the entire disclosure of which is hereby incorporated by reference.

BACKGROUND OF THE INVENTION

1. Field of the Invention

Methods and apparatuses consistent with the present invention relate generally to a channel estimation in an Orthogonal Frequency Division Multiplexing (OFDM) wireless communication system, and in particular, to low-complexity channel estimation for a block-type training sequence 2. Description of the Related Art Generally, channel estimation is achieved based on the so-called training sequence, and the training sequence can have a block structure. The training sequence is equal in structure to the IEEE 802.11 training sequence. A simple channel estimation algorithm includes a Least-Square (LS) algorithm, and actually, the LS algorithm is very popularly used. As a well-known algorithm improved in performance from the LS algorithm, there is a Minimum-Mean-Square-Error (MMSE) algorithm. However, an increase in the complexity of the MMSE algorithm is very considerable in actual application. Characteristics of the two different channel estimation algorithms are as follows:

LS algorithm: low complexity but has normal performance.

MMSE algorithm: good performance but has very high complexity.

Generally, because there is a tradeoff between the complexity and the performance as described above, a decrease in the complexity can considerably decrease the performance. Accordingly, there is a need for a channel estimation algorithm having low complexity and high performance for actual application. That is, there is a demand for a channel estimation algorithm which is higher in performance than the LS algorithm, and lower in complexity than the MMSE algorithm.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide a channel estimation method and apparatus that can acquire performance approaching that of the MMSE algorithm while maintaining low complexity.

According to one aspect of exemplary embodiments of the present invention, there is provided a method for estimating a channel in an Orthogonal Frequency Division Multiplexing (OFDM) wireless communication system. The channel estimation method includes receiving a training sequence, and performing Least-Square (LS) channel estimation on each of a predetermined number of subcarriers independently; separating the predetermined number of subcarriers into a predetermined number of groups; calculating a Split Minimum-Mean-Square-Error (S-MMSE) filter for a subcarrier in each group; and estimating an S-MMSE channel by applying the S-MMSE filter to each of the groups.

According to one aspect of exemplary embodiments of the present invention, there is provided an apparatus for estimating a channel in an Orthogonal Frequency Division Multiplexing (OFDM) wireless communication system. The channel estimation apparatus includes a Least-Square (LS) channel estimator for receiving a training sequence, and performing LS channel estimation on each of a predetermined number of subcarriers independently; and a Split Minimum-Mean-Square-Error (S-MMSE) channel estimator for separating the predetermined number of subcarriers into a predetermined number of groups, calculating an S-MMSE filter for a subcarrier in each group, and estimating an S-MMSE channel by applying the S-MMSE filter to each of the groups.

BRIEF DESCRIPTION OF THE DRAWINGS

The above and other aspects and features of the present invention will become more apparent from the following detailed description when taken in conjunction with the accompanying drawings in which.

Throughout the drawings, the same drawing reference numerals will be understood to refer to the same elements, features and structures.

DETAILED DESCRIPTION OF EXEMPLARY EMBODIMENTS

Exemplary embodiments of the present invention will now be described in detail with reference to the drawings. In the following description, a detailed description of known functions and configurations incorporated herein has been omitted for clarity and conciseness.

The basic concept of the present invention will first be described below. A proposed channel estimation algorithm according to an exemplary embodiment of the present invention relates to a discontinuous time baseband channel estimation method in an OFDM wireless communication system. That is, the proposed channel estimation algorithm relates to a new Split-MMSE channel estimation algorithm that has lower complexity than the MMSE algorithm and has higher performance than the LS algorithm.

General Channel Estimation

Generally, OFDM has emerged as an effective method for overcoming Inter-Symbol Interference (ISI) of a wireless channel. In addition, OFDM is simple in implementation, because it can sufficiently cancel the ISI with a simple Fast Fourier Transform (FFT) process instead of high-complexity channel equalization. As a result, OFDM can convert a channel with ISI into a set of independent ISI-free channels located in sub carriers.

In addition, a Multi-Input Multi-Output (MIMO) system employing multiple antennas for a transceiver can noticeably increase data rate without expansion of channel bandwidth. OFDM can be easily coupled to the MIMO system, like the existing MIMO algorithm which could be easily applied. A combined type of the OFDM and MIMO algorithms will now be described with reference to FIG. 1.

Figure 1:
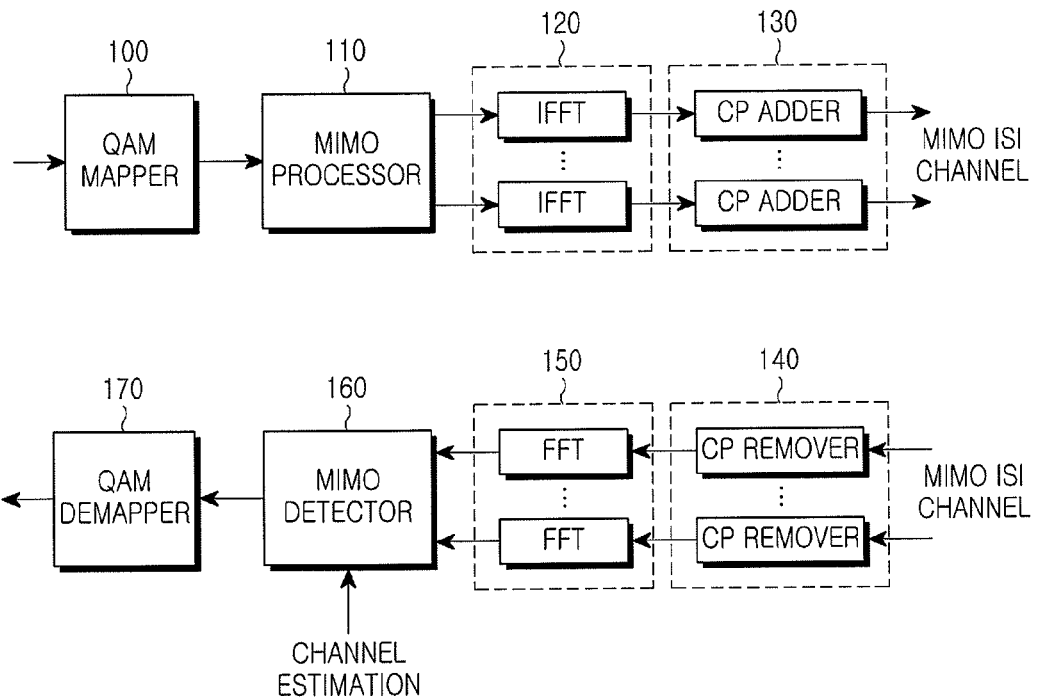
FIG. 1 is a diagram illustrating a general OFDM transceiver.

FIG. 1 is a diagram illustrating a general OFDM transceiver.

Referring to FIG. 1, a transmitter includes a Quadrature Amplitude Modulation (QAM) mapper 100, a MIMO processor 110, an Inverse Fast Fourier Transform (IFFT) block 120 and a Cyclic Prefix (CP) adder 130, and a receiver includes a CP remover 140, a Fast Fourier Transform (FFT) block 150, a MIMO detector 160 and a QAM demapper 170.

In the transmitter, bit streams are provided to the QAM mapper 100, and the QAM mapper 100 generates QAM symbols. For the MIMO system, the MIMO processor 110 follows QAM mapping such as space-time coding (STC) or spatial multiplexing. For the single-antenna system, the MIMO processor 110 simply serves as a null block. For each transmission antenna, a QAM signal is buffered together with a guard band and a DC subcarrier (a subcarrier having the same frequency as the RF center frequency of a base station or a terminal) until it reaches an FFT size. Each symbol provided from the MIMO processor 110 undergoes Inverse Fourier Fast Transform (IFFT) by the IFFT block 120. Thereafter, in the CP adder 130, a CP is added to the head of each IFFT output, and each of the signals generated in this way is transmitted to the receiver over a MIMO ISI channel.

In the receiver, the CP remover 140 removes a CP from the signal received over the MIMO ISI channel after time and frequency synchronization. In the FFT block 150, the CP-removed signal is buffered until it reaches an FFT size, and is converted into a frequency-domain signal by FFT. For each subcarrier, the MIMO detector 160 collects signals from corresponding reception antennas, and generates QAM signals. For the single-antenna system, the MIMO detector 160 is a frequency-domain one-tap equalizer. The QAM demapper 170 demaps QAM signals into bits.

To sum up, in the transmitter, QAM signals are provided to a MIMO processing block that generates spatial streams for multiple transmission antennas. A CP is added to each spatial stream processed by IFFT, because the processed spatial stream is transmitted. In the receiver, a CP part is removed from each received stream, and the CP-removed signal is processed by FFT. The FFT output is free from ISI, and spatial interference caused by the multiple transmission antennas is cancelled or reduced by MIMO detection. Typically, estimation of a valid channel from an input to the IFFT in the transmitter to the FFT output in the receiver needs MIMO detection.

Channel estimation for OFDM is relatively simple. In the existing Single-Input Single-Output (SISO)-OFDM system, various channel estimation algorithms have been proposed. One algorithm is the Least-Square (LS) algorithm due to its simplicity. The LS algorithm performs channel estimation by simply zero-forcing (ZF) a received signal of a training sequence in each subcarrier. However, due to the simplicity of the LS algorithm, its performance is poor particularly in terms of the bit error rate at a low Signal-to-Noise Ratio (SNR).

Another algorithm shows better performance, but generally requires higher complexity. For linear MMSE estimation described in FIGS. 2A and 2B, a linear filter K applied for LS estimation improves accuracy of the channel estimation when it is given as $$K = R_{hh}(R_{hh} + N_0 I)^{-1} \qquad \text{EQN. 1}$$

where $R_{hh}$ denotes a correlation matrix of a channel, $N_0$ denotes a noise variance, and I denotes an identity matrix.

The MMSE estimation requires the knowledge for the correlation matrix $R_{hh}$ and the noise variance $N_0$. Complexity of the MMSE estimation, because a dimension of $R_{hh}$ is very large, is very high due to inversion of a matrix during calculation of K. For example, IEEE 802.11 uses 64 FFT size. In this case, the number of subcarriers used is 52, which means the need for inversion of a 52 by 52 matrix.

Figure 2A:
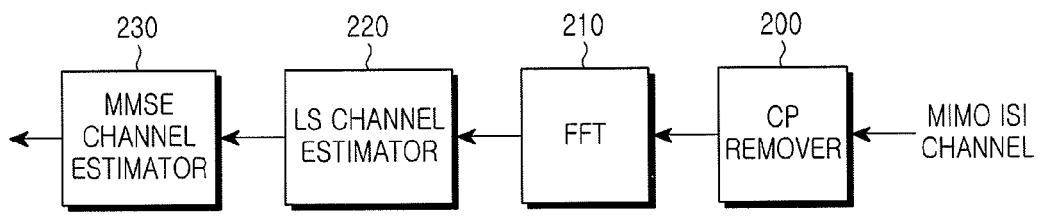
FIG. 2A is a block diagram of a general MMSE channel estimator.
Figure 2B:
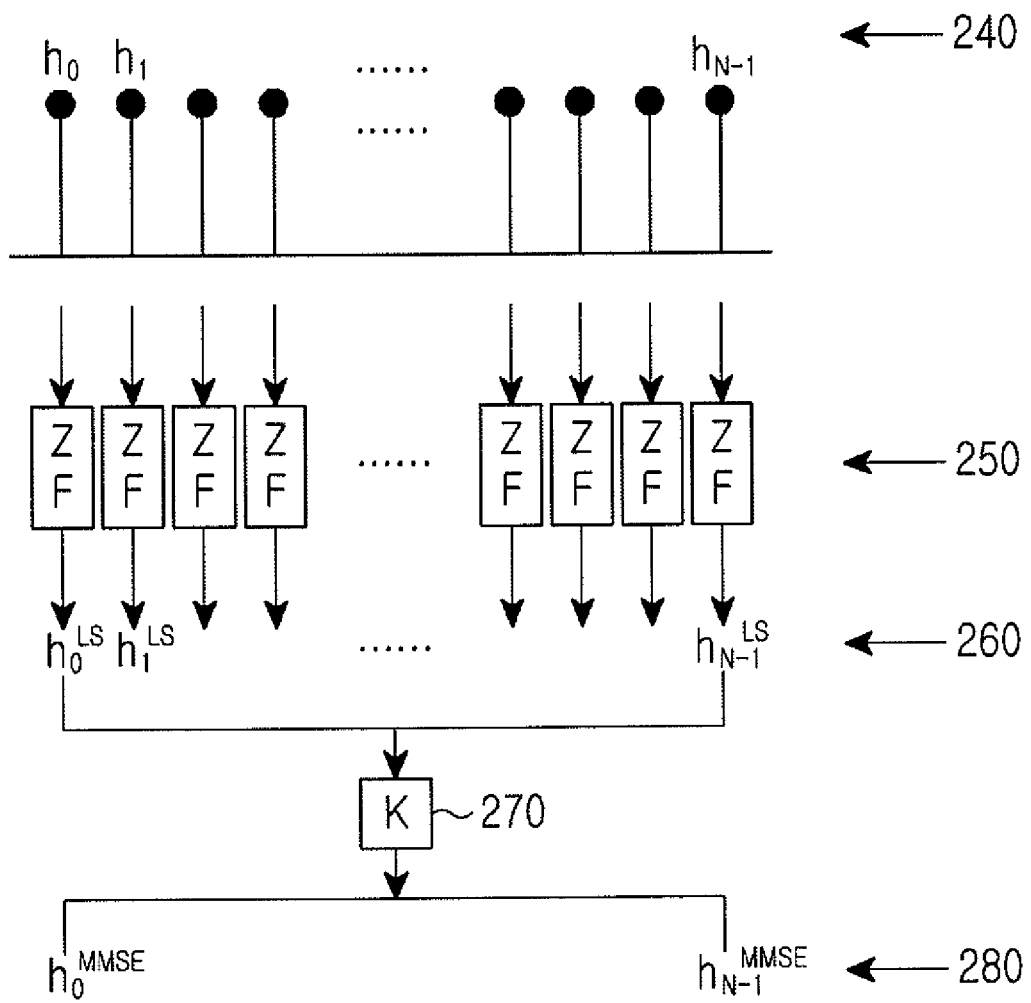
FIG. 2B is a diagram illustrating an MMSE estimation procedure of a general MMSE channel estimator.

FIG. 2A is a block diagram of a general MMSE channel estimator, and FIG. 2B is a diagram illustrating an MMSE estimation procedure of a general MMSE channel estimator.

Referring to FIG. 2A, received signals are converted into frequency-domain signals through a CP remover 220 and an FFT block 210. In an LS channel estimator 200, the converted signals undergo LS channel estimation as coarse estimation. Thereafter, the LS channel estimated signals are filtered by an MMSE filter 230.

Referring to FIG. 2B, LS estimations 260 are acquired by performing zero-forcing 250 on a training sequence 240 received at each subcarrier. Signals received at different subcarriers are independent of each other in terms of the LS estimations 260. A frequency-domain MMSE filter K 270 is applied to the LS estimations 260 to provide MMSE estimations 280. In FIG. 2B, a dimension of K is N by N, where N denotes the number of subcarriers used.

An algorithm according to an exemplary embodiment of the present invention provides a channel estimation method that can acquire performance approaching that of the MMSE algorithm while maintaining low complexity. Generally, because there is a tradeoff between complexity and performance, a decrease in the complexity considerably decreases the performance. A cause for overcoming the tradeoff will now be described from Equation (1) below.

The high complexity of the MMSE is mainly caused by inversion of a matrix of Equation (1). The complexity can be remarkably reduced by reducing a size of the correlation matrix $R_{hh}$. The proposed algorithm separates subcarriers into size-S subgroups, instead of applying an MMSE filter to every subcarrier. In this case, a separation filter is defined as $$K_S = R_{hh,S}(R_{hh,S} + N_0 I_S)^{-1} \qquad \text{EQN. 2}$$

where $R_{hh,S}$ denotes a correlation matrix of a channel for size-S subgroups separated from subcarriers, $N_0$ denotes a noise variance, and $I_S$ denotes an identity matrix.

The separation filter is applied to each subgroup as described below with reference to FIG. 3.

In Equation (2) above, there is a need for inversion of only the S by S matrix, thus contributing to a noticeable reduction in the complexity. The reduction may cause another problem during calculation of $R_{hh}$, and a detailed description thereof will be given below. The use of the Split-MMSE filter inevitably brings performance degradation. Specifically, an increase in S reduces the performance degradation, but increases the complexity. As can be understood from the following numeration result, S=4 is a good selection in which both the performance and the complexity are taken into account.

For example, for S=4, a correlation matrix $R_{hh,S}$ has the following structure.

$$R_{hh,4} = \begin{bmatrix} \rho_0 & \rho_1 & \rho_2 & \rho_3 \\ \rho_1^* & \rho_0 & \rho_1 & \rho_2 \\ \rho_2^* & \rho_1^* & \rho_0 & \rho_1 \\ \rho_3^* & \rho_2^* & \rho_1^* & \rho_0 \end{bmatrix} \quad \text{EQN. 3}$$

In this example, therefore, only 4 correlation coefficients should be estimated.

Figure 3:
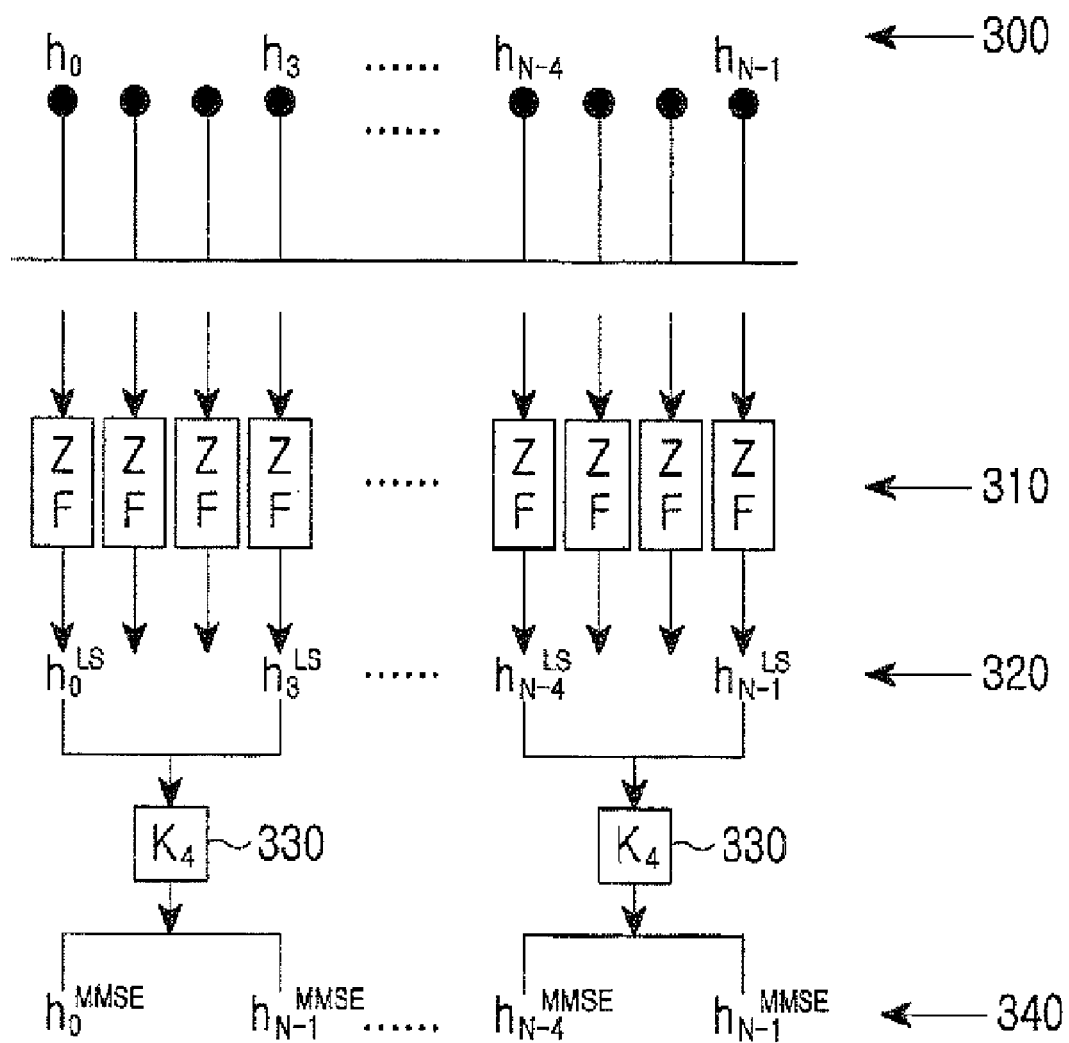
FIG. 3 is a diagram illustrating a Split-MMSE estimation procedure according to an exemplary embodiment of the present invention.

FIG. 3 is a diagram illustrating a Split-MMSE estimation procedure according to an exemplary embodiment of the present invention.

Referring to FIG. 3, LS estimations 320 are acquired by performing zero-forcing 310 on a training sequence 300 received at each subcarrier. Signals received at different subcarriers are independent of each other in terms of the LS estimations 320. The same frequency-domain MMSE filters K 330 are applied to the LS estimations 320 to provide MMSE estimations 340. That is, the algorithm applies the Split-MMSE filters 330 to the subcarrier groups for the LS estimations 320, instead of applying the filter K to the LS estimations 260 in FIG. 2. In FIG. 3, a size of the subgroups is S=4 and a dimension of the Split-MMSE filters is 4×4.

Figure 4:
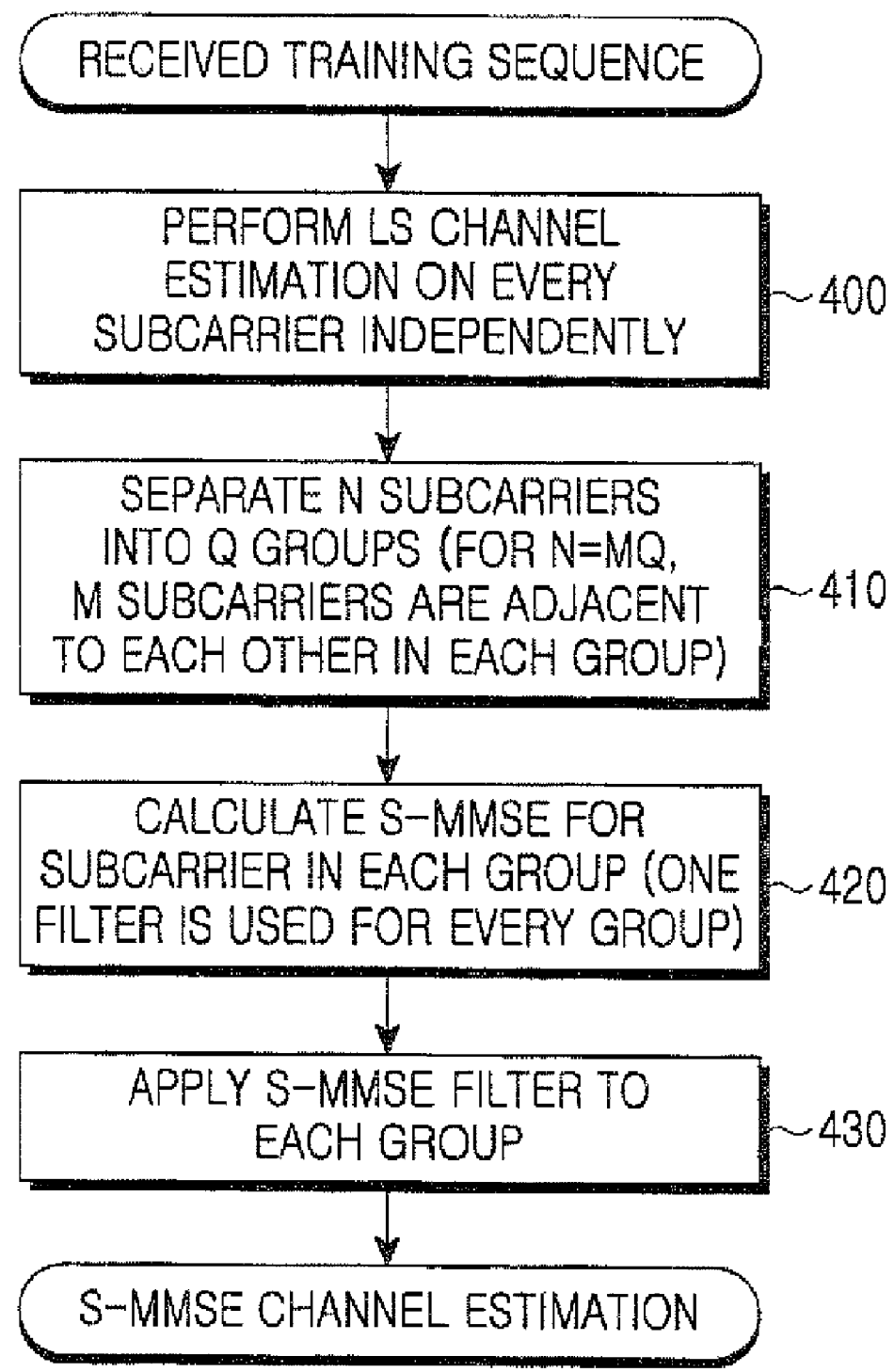
FIG. 4 is a flowchart illustrating a Split-MMSE channel estimation procedure of a channel estimation apparatus according to an exemplary embodiment of the present invention.

FIG. 4 is a flowchart illustrating a Split-MMSE channel estimation procedure of a channel estimation apparatus according to an exemplary embodiment of the present invention.

Referring to FIG. 4, in operation 400, an LS channel estimator of the channel estimation apparatus receives a training sequence and performs LS channel estimation on each of a predetermined number of subcarriers independently. In operation 410, a Split-MMSE channel estimator of the channel estimation apparatus separates the predetermined number of subcarriers into a predetermined number of groups. In this case, N=MQ is satisfied, and M subcarriers are adjacent to each other in each group. In operation 420, the Split-MMSE channel estimator of the channel estimation apparatus calculates a Split-MMSE (S-MMSE) for a subcarrier in each group. In this case, one filter is used for every group. In operation 430, the Split-MMSE channel estimator of the channel estimation apparatus estimates an S-MMSE channel by applying an S-MMSE filter to each of the groups.

Figure 5:
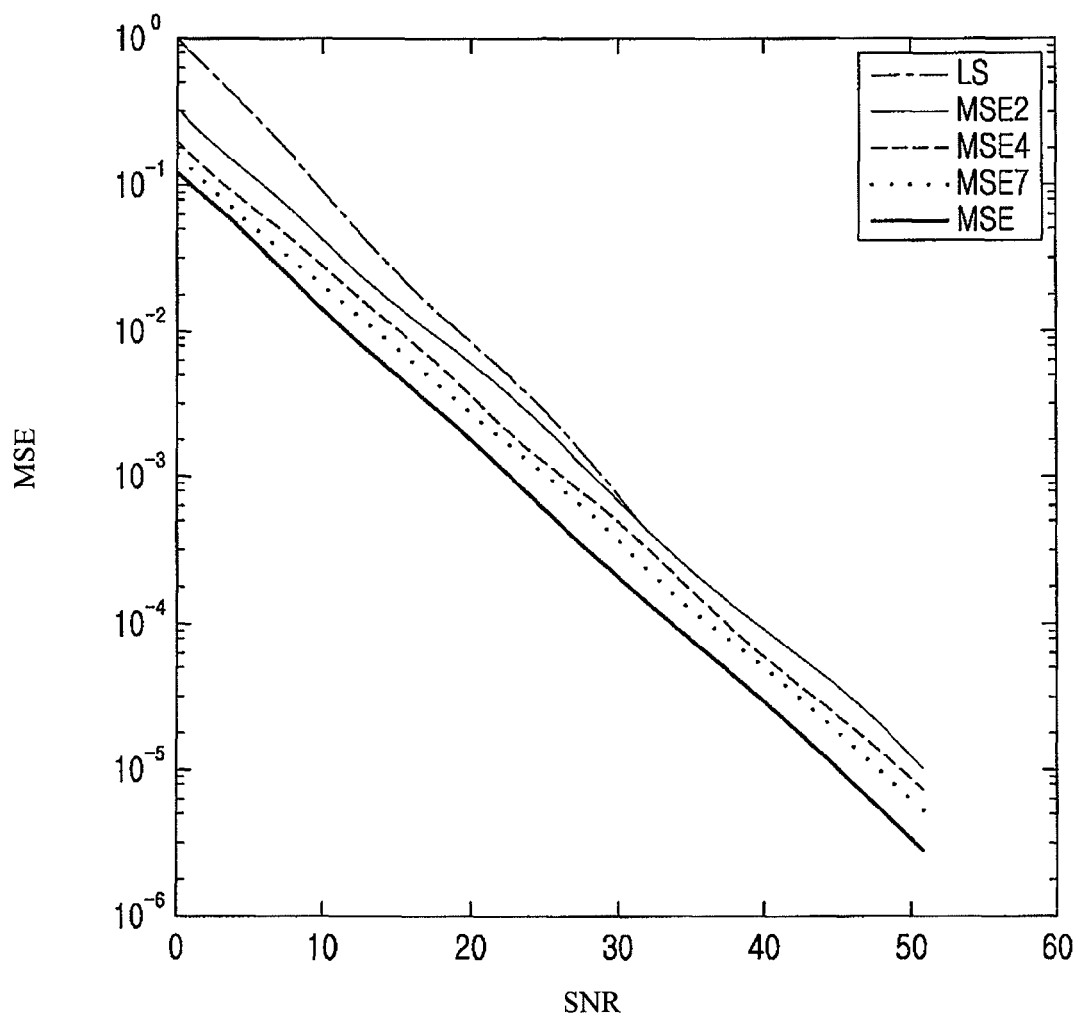
FIG. 5 is a diagram illustrating a comparison between the new Split-MMSE algorithm and the existing MMSE algorithm in terms of the simulation results on a mean squared error (MSE).

FIG. 5 is a diagram illustrating a comparison between the new Split-MMSE algorithm and the existing MMSE algorithm in terms of the simulation results on a mean squared error (MSE).

Referring to FIG. 5, 2 transmission antennas, 2 reception antennas, and a 64 FFT size are considered, and the subcarrier structure follows the standard. For the Split-MMSE, subgroup sizes S=2, S=4 and S=7 were taken into consideration, and when the Split-MMSE filters are applied, DC subcarriers are omitted. LS, MSE, MMSE2, MMSE4, MMSE7 and MMSE are shown, where MMSE7 denotes a Split-MMSE algorithm with S=7. It can be noted that MMSE and Split-MMSE are superior to LS particularly at low SNR. Therefore, S=4 can be a good selection when the complexity is considered.

In addition, a correlation matrix and a noise variance are assumed to be ideal. The MSE algorithm exhibits the highest performance, while the LS algorithm shows the lowest performance. The Split-MMSE estimation shows intermediate performance between the MMSE and LS algorithms. In Legend, Split-MMSE estimation is indicated by MSE4 for a 4 by 4 correlation matrix. As expected, the performance is improved as the correlation matrix grows.

As can be understood from the foregoing description, the present invention provides an actual estimation method and apparatus that can remarkably improve LS channel estimation performance without an increase in the complexity for noise variance-based Split-MMSE algorithm and estimation of the correlation matrix.

While the invention has been shown and described with reference to a certain exemplary embodiment thereof, it will be understood by those skilled in the art that various changes in form and details may be made therein without departing from the spirit and scope of the invention as defined by the appended claims.

What is claimed is:

1. A method for estimating a channel in an Orthogonal Frequency Division Multiplexing (OFDM) wireless communication system, the method comprising:
    receiving a training sequence and performing Least-Square (LS) channel estimation on each of a predetermined number of subcarriers independently;
    grouping the predetermined number of subcarriers into a predetermined number of groups;
    calculating a Split Minimum-Mean-Square-Error (S-MMSE) filter for a subcarrier in each of the predetermined number of groups; and
    estimating an S-MMSE channel by applying the S-MMSE filter to each of the predetermined number of groups.

2. The method of claim 1, wherein in each of the predetermined number of groups, a number of subcarriers is determined by dividing the predetermined number of subcarriers by the predetermined number of groups, and the subcarriers are adjacent to each other.

3. The method of claim 1, wherein the S-MMSE filter is applied to each of the predetermined number of groups.

4. The method of claim 1, wherein the S-MMSE filter denoted by $K_S$ satisfies the following equation:

$$K_S = R_{hh,S}(R_{hh,S} + N_0 I_S)^{-1}$$

where $R_{hh,S}$ denotes a correlation matrix of a channel h for size-S subgroups grouped from subcarriers, $N_0$ denotes a noise variance, and $I_S$ denotes an identity matrix.

5. An apparatus for estimating a channel in an Orthogonal Frequency Division Multiplexing (OFDM) wireless communication system, the apparatus comprising:
    a Least-Square (LS) channel estimator which receives a training sequence, and performs LS channel estimation on each of a predetermined number of subcarriers independently; and
    a Split Minimum-Mean-Square-Error (S-MMSE) channel estimator which groups the predetermined number of subcarriers into a predetermined number of groups, calculates an S-MMSE filter for a subcarrier in each group, and estimates an S-MMSE channel by applying the S-MMSE filter to each of the predetermined number of groups.

6. The apparatus of claim 5, wherein in each of the predetermined number of groups a number of subcarriers is determined by dividing the predetermined number of subcarriers by the predetermined number of groups, and the subcarriers are adjacent to each other.

7. The apparatus of claim 5, wherein the S-MMSE filter is applied to each of the predetermined number of groups.

8. The apparatus of claim 5, wherein the S-MMSE filter denoted by $K_S$ satisfies the following equation:

$$K_S = R_{hh,S}(R_{hh,S} + N_0 I_S)^{-1}$$

where $R_{hh,S}$ denotes a correlation matrix of a channel h for size-S subgroups separated from subcarriers, $N_0$ denotes a noise variance, and $I_S$ denotes an identity matrix.

9. A method for estimating a channel in an Orthogonal Frequency Division Multiplexing (OFDM) wireless communication system, the method comprising:

receiving a training sequence, and performing channel estimation on each of a predetermined number of subcarriers;

grouping the predetermined number of subcarriers into a predetermined number of groups;

calculating a Split Minimum-Mean-Square-Error (S-MMSE) filter for a subcarrier in each of the predetermined number of groups; and estimating an S-MMSE channel by applying the S-MMSE filter to each of the predetermined number of groups.

10. An apparatus for estimating a channel in an Orthogonal Frequency Division Multiplexing (OFDM) wireless communication system, the apparatus comprising:

a channel estimator which performs channel estimation on each of a predetermined number of subcarriers; and a Split Minimum-Mean-Square-Error (S-MMSE) channel estimator which groups the predetermined number of subcarriers into a predetermined number of groups, calculates an S-MMSE filter for a subcarrier in each group, and estimates an S-MMSE channel by applying the S-MMSE filter to each of the predetermined number of groups.

* * * * *